(12) United States Patent
Paris et al.

(10) Patent No.: US 9,025,657 B2
(45) Date of Patent: *May 5, 2015

(54) SEEDING OF A WORKSPACE TO OPTIMIZE CODEC OPERATIONS

(71) Applicant: Centri Technology, Inc., Seattle, WA (US)

(72) Inventors: Luis Gerardo Paris, Hershey, PA (US); Michael Patrick Mackey, Lake Stevens, WA (US)

(73) Assignee: Centri Technology, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,633

(22) Filed: Aug. 7, 2014

(65) Prior Publication Data

US 2014/0359082 A1    Dec. 4, 2014

Related U.S. Application Data

(63) Continuation of application No. 13/909,921, filed on Jun. 4, 2013, now Pat. No. 8,804,814.

(51) Int. Cl.
*H04B 1/66* (2006.01)
*H04L 29/06* (2006.01)
*H04N 19/423* (2014.01)

(52) U.S. Cl.
CPC .............. *H04L 65/607* (2013.01); *H04L 69/04* (2013.01); *H04N 19/423* (2014.11)

(58) Field of Classification Search
CPC ............ G06T 9/004; H04N 19/00951; H04N 19/00309; H04N 19/00478; G06F 17/30153; H03M 7/30
USPC .................................... 375/240, 241
See application file for complete search history.

(56) References Cited

U.S. PATENT DOCUMENTS

| | | | | |
|---|---|---|---|---|
| 6,668,089 | B1 * | 12/2003 | Bracamonte et al. | 382/239 |
| 8,804,814 | B1 * | 8/2014 | Paris et al. | 375/240 |
| 2002/0035471 | A1 * | 3/2002 | Breton | 704/233 |
| 2004/0190782 | A1 * | 9/2004 | Nomizu et al. | 382/232 |
| 2011/0238943 | A1 * | 9/2011 | Devendran et al. | 711/170 |
| 2011/0296419 | A1 * | 12/2011 | Dumas et al. | 718/101 |

* cited by examiner

*Primary Examiner* — Don N Vo
(74) *Attorney, Agent, or Firm* — John W. Branch; Lowe Graham Jones PLLC

(57) ABSTRACT

Various embodiments are directed toward compressing and/or decompressing data communicated between one or more network devices (e.g., codec operations). In particular, embodiments are directed towards improving codec performance by seeding the computation workspace that may be used by various codec processors. The seeding data may be determined based on at least one characteristic of a particular codec and the characteristics of data that may be processed by the codec processor. Also, the codec processor may be employed to generate data for the codec workspace based on the determined seeding data. Workspace data may be generated by processing the seeding data with the same codec processor that is used for normal codec operations. The workspace generated from the seeding data may be stored for future use, such as, when a matched data stream arrives.

24 Claims, 12 Drawing Sheets

```
Seeding( seed (in), seeded_mem (out) )
    seed: seed contents
    nil: null device
    seeded_mem: memory workspace to be seeded
    Reset seeded_mem contents
    Compress( istream = seed, ostream = nil, mem = seeded_mem)
End Seeding
```

*Fig. 12A*

```
Compress( istream (in), ostream (out), mem (in/out) )
    istream: input stream
    ostream: output stream
    mem: memory workspace
    engine_state: current state of compression engine
    engine_state = Engine_Create()
    For each symbol in istream
        cmprblk: compressed block
        cmprblk = Engine_Compress( symbol, mem, engine_state)
        if cmprblk output available AND ostream NOT nil
            append cmprblk to ostream
        End if
    End For
    Engine_Destroy( engine_state)
End Compress
```

*Fig. 12B*

SEEDING OF A WORKSPACE TO OPTIMIZE CODEC OPERATIONS

This application is a continuation of U.S. patent application Ser. No. 13/909,0921 filed on Jun. 4, 2013 claiming the benefit of the earlier filing date of which is hereby claimed under 35 U.S.C. §119 (e) and which is further incorporated herein by reference.

TECHNICAL FIELD

The present invention relates generally to data processing operations, in particular, but not exclusively to compression and decompression of data.

BACKGROUND

Vast amounts of data are transmitted and received every day in a variety of contexts, from all manner of devices, including, mobile phones, personal computers, backend data servers, or the like. One major concern is the size of data transmitted. Data transmitted from one endpoint to another may travel through a variety of intermediate networking hardware, such as routers, switches, servers, Internet service providers (ISPs), and so forth. Each intermediate entity is affected by the size of the data, which consumes resources such as, memory, CPU, network bandwidth, cache space, or the like.

Data compression is designed to help alleviate these potential problems by reducing data size. Since bandwidth and storage may be scarce resources for both analog and digital communication, the need for compressing information to use less space is also a needed commodity. The goal of data compression is to represent the exchanged information in a more compact form that takes less space to store and less time to transmit. A sender may compress data by noticing redundancies in the data, finding patterns in the data, and applying a variety of other well-known compression techniques. A receiver may employ shared knowledge about the compression method used to decompress the compressed data hack into an uncompressed form. Compression may occur at the sender, at intermediate entities between the sender and receiver (e.g. TCP header compression), or anywhere else, in the communication chain. Thus, it is in the consideration of at least these issues that the following subject matter is directed.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIGS. 12A-12B shows a portion of pseudo-code for performing codec operations using workspace data generated from seeding data, in accordance with at least one of the various embodiments.

DETAILED DESCRIPTION

Figure 1:
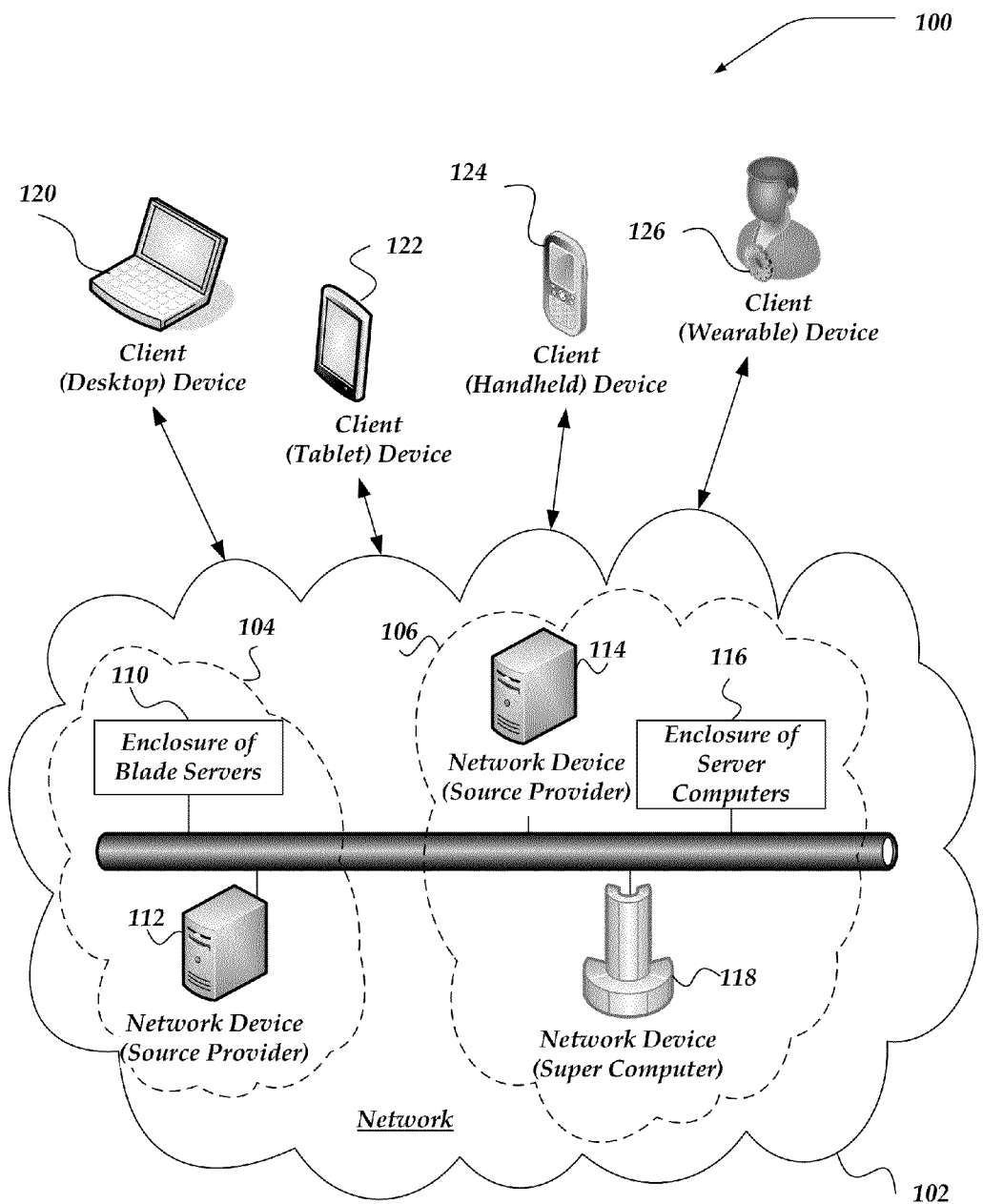
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The terms "codec," and "codec operations" as used herein, refers to methods and processes for compression and decompression of data.

The term "asymmetrical codec," as used herein refers to a method for characterizing codes based on whether the operations of compression and decompression for a given codec have different levels of complexity or may require different inputs. For example, an asymmetrical codec may use a workspace during compression operations that is not required for decompression operations. Examples, of asymmetrical codecs may include LZ77 variants, or the like.

The term "symmetric codec," as used herein refers to a method for characterizing codecs based on whether the operations of compression and decompression for a given codec have the same level of complexity or may require the same inputs. Generally, symmetric codecs use same amount of time and/or resources to compress data as they do to decompress data. For example, a symmetrical codec may use initialized workspace data during both compression operations and decompression operations. Often, though not invariably, symmetric codec may be used in streaming operations where the data must be compressed as fast as it is decompressed.

The term "workspace," as used herein refers to a defined memory space used as temporary workspace for a codec. The specific content and size of a workspace depends on the particular codec being used. Symmetric codecs that use a workspace may use the workspace both for compression operations and decompression operations. In contrast, some asymmetrical codecs may use a dedicated workspace for only one side of the codec operation, either compression or decompression, depending on the particular asymmetrical codec.

The term "workspace data," as used herein refers to the data values that are stored in a workspace during the codec operations. Generally, theses values may change as the codec operations are in process with the particular values and formatting depending on the content stream being processed and the particular codec being used.

The term "seeding data," as used herein, refers to data that may be processed to generate workspace data for seeding codec operations.

The term "input stream," as used herein, refers to a logical input point where data enters a codec processors. Input streams may be implemented using a variety of well-known software and hardware techniques. Input stream, as used herein may refer to any particular implementation of a method of providing external data to a system.

The term "output stream," as used herein, refers to a logical output point where data that has been processed by codec processors may be provided to other process and/or systems. Output streams may be implemented using a variety of well-known software and hardware techniques. Output stream, as used herein may refer to any implementation for providing data to an external system.

The term "compressed stream," as used herein, refers to a stream of data that has been compressed by a codec processor. It may be provided on either an input stream or an output stream depending on the circumstances and/or the direction of a communication flow.

The term "decompressed stream," as used herein, refers to a stream of data that has been compressed by a codec processor. It may be provided on either an input stream or an output stream depending on the circumstances and/or the direction of a communication flow.

The term "source stream," as used herein, refers to the original stream of data that awaits compression by the codec processor. In general, data from a source stream may be provided to a codec system by way of an input stream.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed toward compressing and/or decompressing data communicated between one or more network devices (e.g. codec operations). In particular, embodiments are directed towards improving codec performance by seeding the computation workspace that may be used by various codec processors. The seeding data may be determined based on at least one characteristic of a particular codec and the characteristics data that may be processed by the codec processor. E.g., seeding data may be different for different types and/or formats of data. From the seeding data, the codec processor may generate data for the codec workspace based on the determined seeding data and the codec. In at least one of the various embodiments, the workspace data may be generated by processing the seeding data with the same codec processor that is used for normal codec operations. The workspace generated from the seeding data may be indexed and/or stored for future use, such as, when a matched data stream arrives.

In at least one of the various embodiments, if data is provided to an input stream of a codec processor, the codec processor may determine a particular portion of workspace data and load it into the codec processor based on at least one characteristic of the provided data. The workspace data that has been generated from the seeding data may be employed during the initial codec operations to modify (e.g. compress or decompress) the data provided to the input stream. Next, in at least one of the various embodiments, the codec processor may provide the modified data to an output stream. In at least one of the various embodiments, codec operations may include, compressing or decompressing data.

In at least one of the various embodiments, if the codec is an asymmetrical codec and the provided data is being decompressed, the seeding data may be pre-pended to the output stream before decompressing the provided data. Also, in at least one of the various embodiments, if the codec is an asymmetrical codec and the provided data is being compressed, the seeding data may be pre-pended to the input stream before compressing the provided data. In at least one of the various embodiments, the seeding data may be communicated between network devices enabling them to synchronize seeding data if necessary.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include nodule, processes, components, services, or the like, and which are operative to perform codec operations.

Also, in at least one of the various embodiments, enclosure of blade servers 110, enclosure of enclosure of server computers 116, super computer network device 118 may include network devices that perform codec operations. In at least one embodiment, at least one blade server or at least one server computer may be arranged to perform codec operations.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices. Personal Digital Assistants (PDAs), televisions, integrated devices combining at least one of the preceding devices, and the like. Each client device may also include hardware and/or software components for codec operations.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WVANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports. Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modern and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and, or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G), $6^{th}$ (6G), generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS). Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
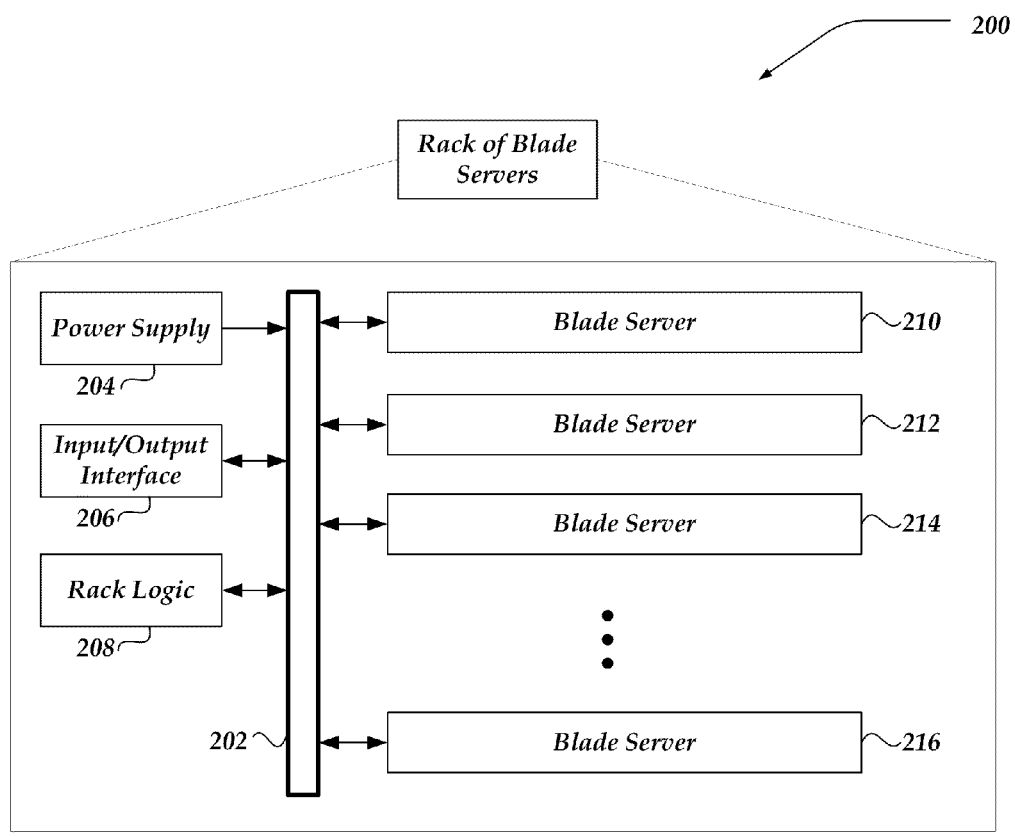
FIG. 2A shows a schematic drawing of a rack of blade servers.

FIG. 2A shows one embodiment of an enclosure of blade servers 200, which are also illustrated in FIG. 1. Enclosure of blade servers 200) may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and blade server interconnect 202. Power supply 204 provides power to each component and blade server within the enclosure. The input/ output interface 206 provides internal and external communication for components and blade servers within the enclosure. Backplane 208 can enable passive and active communication of power, logic, input signals, and output signals for each blade server.

Illustrative Blade Server

FIG. 21B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 202, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or oilier data. Data store 270 may include program code, data, algorithms, and the like, for use by processor 252 to execute and perform actions such as those described in conjunction with FIGS. 6-11. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, Seeding Data 274, Workspace 276, Stream Buffers 278, or the like. Seeding Data 274 is arranged to store data for seeding codec operations, as well as other supporting data. Likewise, Workspace 276 may be memory used to hold workspace data for codec operations, or the like. Stream Buffers 278 may be used for storage of incoming and/or outgoing data.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Compressor/Decompressor 282, Input Stream 284, and Output Stream 286, which may be enabled to perform actions further described below starting with at least FIG. 5. Human interlace components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, Compressor/Decompressor 282, Input Stream 284, and Output Stream 286 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment, likewise, in at least one of the various embodiments, virtual machines and/or virtual servers for Compressor/Decompressor 282, Input Stream 284, or Output Stream 286 and may be provisioned and dc-commissioned automatically.

Also, in at least one of the various embodiments, Seeding Data 274, Workspace 276, and Stream Buffers 278, or the like, may be located on virtual servers running in a cloud-based computing environment rather than being tied to one or more specific physical blade servers.

Illustrative Client Device

Figure 3:
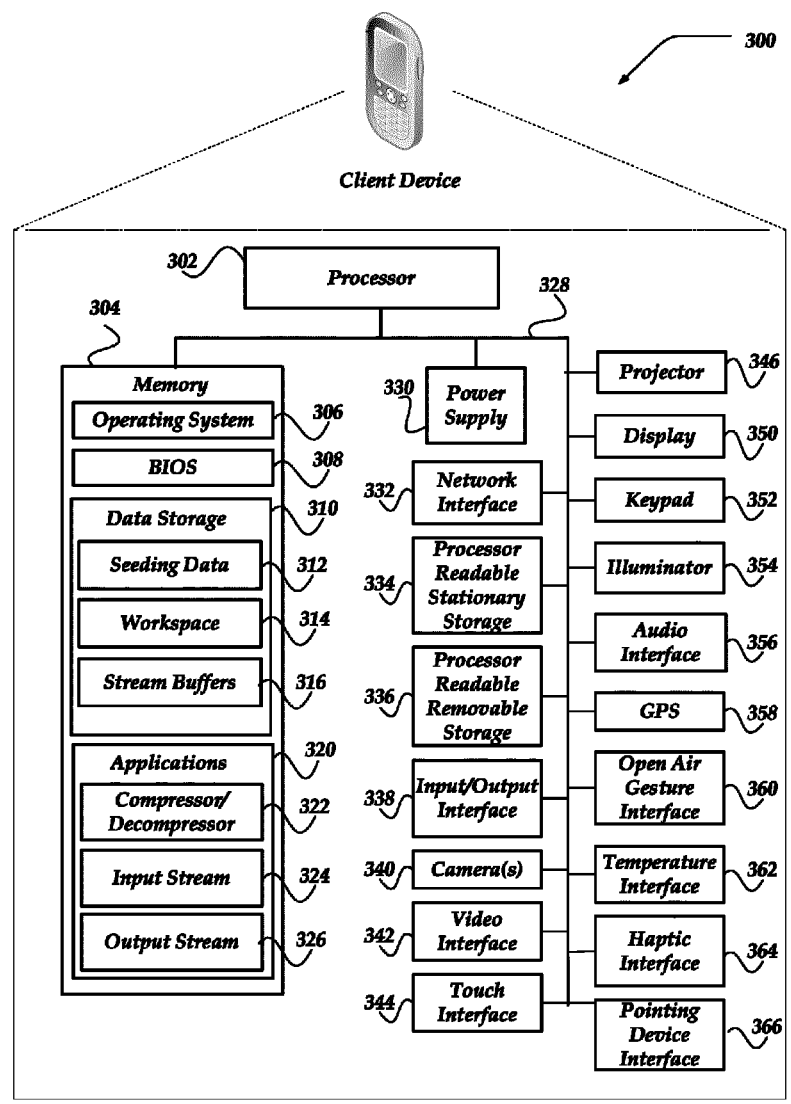
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interlace 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or Linux™, or a specialized mobile computer communication operating system such as Windows Phone™, or the Symbian® operating system. The operating system may include, or interlace with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. Data storage 310 may also include Seeding Data 312, Workspace 314, Stream Buffers 316, or the like. Seeding Data 312 may be arranged to store data for seeding codec operations, as well as other supporting data. Likewise, Workspace 314 may be memory used to hold workspace data for codec operations, or the like. Stream Buffers 316 may be used for interim storage of incoming and/or outgoing data. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, Compressor/Decompressor 322, Input Stream 324, or Output Stream 326.

Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth.

Illustrative Network Device

Figure 4:
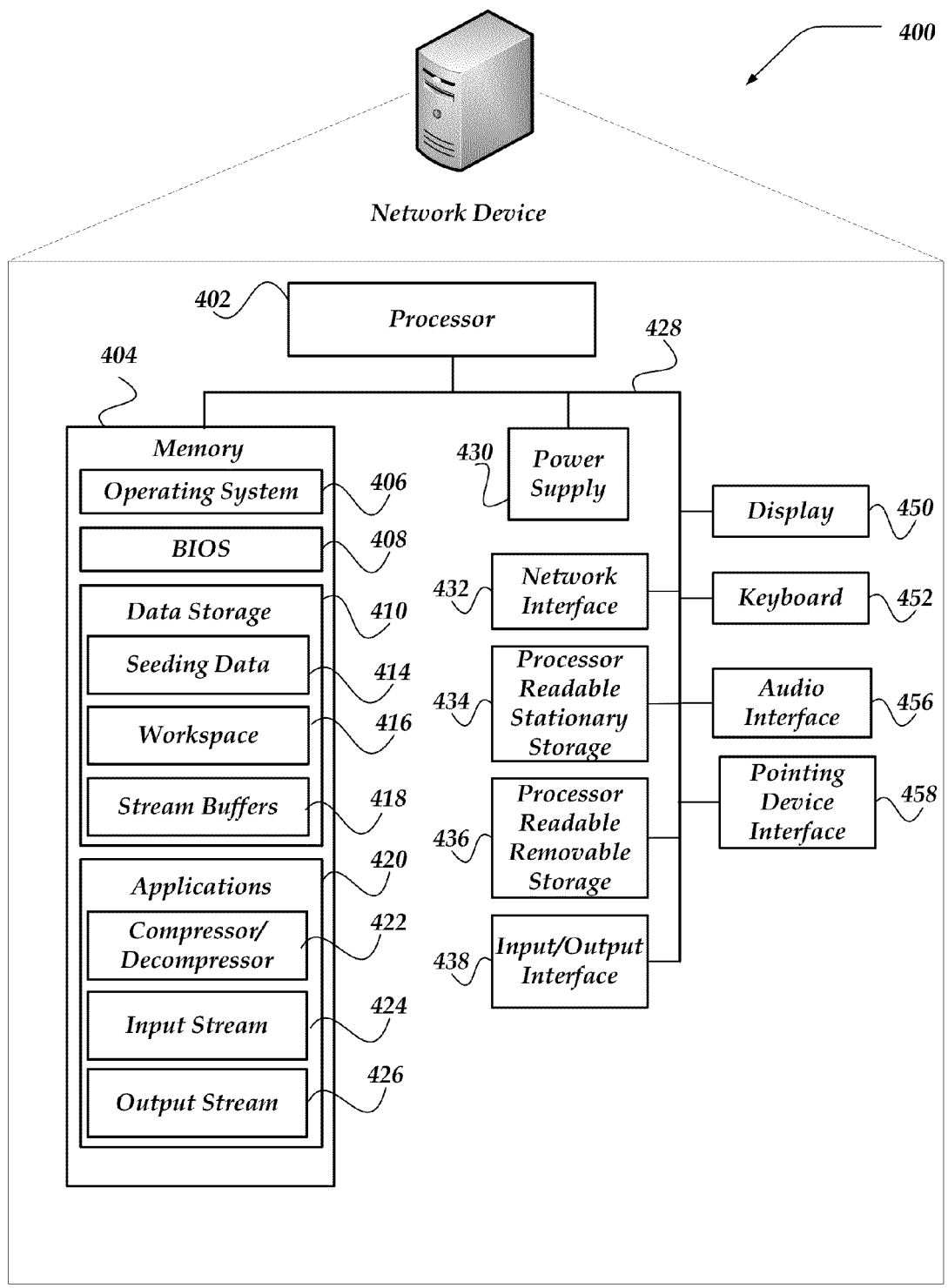
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400) may represent, for example, one embodiment of at least one of network device 112, 114, or 120 of FIG. 1

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with at base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interlace components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or Linux™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-11. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include Seeding Data 414, Workspace 416, Stream Buffers 416, or the like. Seeding Data 414 may be arranged to store data for seeding codec operations, as well as other supporting data. Likewise. Workspace 416 may be memory used to hold workspace data for codec operations, or the like. Stream Buffers 416 may be used for interim storage of incoming and/or outgoing data.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VoIP) applications, contact managers, task managers, transcoders, database programs, word processing programs, security applications, spreadsheet programs, games, search programs, and so forth. Applications 420 may include Compressor/Decompressor 422, Input Stream 424, or Output Stream 426 which may be enabled to perform actions further described below starting with at least FIG. 5. In at least one of the various embodiments, while they may be illustrated here as separate applications. Compressor/Decompressor 422, Input Stream 424, or Output Stream 426 may be implemented as modules and/or components of the same application. Further, in at least one of the various embodiments. Compressor/Decompressor 422. Input Stream 424, or Output Stream 426 may be implemented as operating system extensions, modules, plugins, or the like.

Furthermore, in at least one of the various embodiments, Compressor/Decompressor 422. Input Stream 424, or Output Stream 426 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running Compressor/Decompressor 422, Input Stream 424, or Output Stream 426 may be provisioned and de-commissioned automatically.

Also, in at least one of the various embodiments, Seeding Data 414, Workspace 416, Stream Butlers 418, or the like, may located in virtual servers running in a cloud-based computing environment rather than being tied to one or more specific physical blade servers or server computer devices.

Illustrated Logical Architecture for Codec Operations

FIGS. 5-8 are presented to illustrate and clarify the logical architecture for at least one of the various embodiments.

Figure 5:
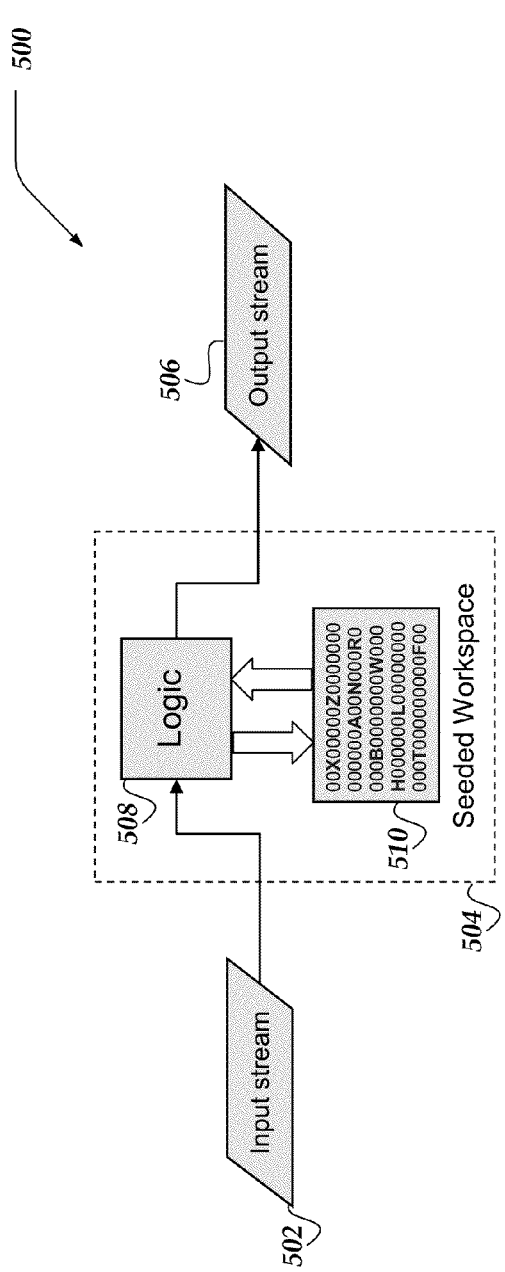
FIG. 5 illustrates a portion of a logical architecture for symmetrical codec operations in accordance with at least one of the various embodiments.

FIG. 5 illustrates a portion of logical codec architecture 500 for symmetrical codec operations in accordance with at least one of the various embodiments. In at least one of the various embodiments, symmetrical codec systems enabled by codec architecture 500 may process data received on an input stream, such as, input stream 502. Data provided to input stream 502 may be part of an active network transmission and/or session, or it may be provided from data stored in a file system, database, or any other data storage system, or data source. The data from input stream 502 may be provided to codec system 504. In at least one of the various embodiments, the amount of data provided from input stream 502 to codec system 504 may vary depending on the characteristic of the codec and the composition of the data. For example, in at least one of the various embodiments, data may be provided to codec system 504 one symbol (e.g., byte, word, char, or the like) at a time. Alternatively, in at least one of the various embodiments, data may be provided in blocks of a determined size, wherein the size of the data block may be pre-determined based on the codec, or the size may be set using a configuration value, or the like. Further in some embodiments, the size of the data block (or the number of data symbols) may adaptively vary depending on the speed of data transmission, data type, codec type, or the like.

In at least one of the various embodiments, codec system 504 may be comprised of one of more hardware modules and/or software modules arranged and/or coupled together to perform compression and/or decompression (codec) operations on the data provided by input stream 502.

In at least one of the various embodiments, data that has been processed by codec system 504 may be provided to output stream 506. The data provided to output stream 506 may be further transmitted to other data processing systems or components for further processing. Also, the data provided by output stream 506 may be sent over a network as part of a network communication session, saved to a file in a local or remote file system, stored in a database, or otherwise processed by other data processing components.

In at least one of the various embodiments, logic block 508 may include hardware or software components, or a combination thereof which may be used to implement one or more compression and/or decompression processors (codec processors). The actual and/or preferred arrangement and composition of logic block 508 may vary depending on the type of compression and/or decompression methods that are being used and/or the application of the codec system. Also, the arrangement of logic block 508 may vary based on the application of the codec processor. For example, in some cases, custom/dedicated hardware components may be employed for performance reasons whereas, in other cases, it may be advantageous to use software modules to implement logic block 508.

In at least one of the various embodiments, logic block 508 may use workspace 510 as part of the codec operations. The composition of the data in the workspace, and how it is used by logic block 508 may vary depending on the particular codec implemented by logic block 508. For example, a symmetrical codec may use workspace 510 to contain redundancy in formation provided by input steam 502. In at least one of the various embodiments, redundancy data in workspace 510 may be used to match data provided by an input stream for replacing the matched data with a reference to the its corresponding location in workspace 510. Thus, for some data, using references into workspace 510 rather the actual data itself may result in advantageous compression of the data. As mentioned above, the size, format, composition, or the like, of workspace 510 and the data within will vary to match the requirement the particular codec that is being used.

In at least one of the various embodiments, codec systems that compress or decompress data may use a workspace as a scratch area, such as workspace 510 to perform operations. In at least one of the various embodiments, depending on the complexity of the compression process, workspace 510 may be large, medium, or small. For instance, a simple symmetrical compression codec may only require a small sized workspace, such as, 128 bytes of scratch workspace. For other codecs, workspace may be size 1024 bytes, 2048 bytes, or any size as dictated by the requirements of the codec being used. In at least one of the various embodiments, other compression codecs not require a separate workspace at all, for example, like Run-Length Encoding (RLE). Others, such as, LZ77 variants use may use the output buffer as temporary workspace.

In at least one of the various embodiments, workspace 510 may be initialized prior to being used for compression or decompression operations. In at least one of the various embodiments, the performance of the codec may be impacted by the content of the workspace. In some cases, the data used to initialize, or seed, a workspace may be selected based on the type of data being compressed. The particular seeding data may be selected such that it improves codec performance. For example, if compressing text, better compression results may be obtained it the workspace is initialized with a fill space character, like ASCII code 20h, a common text character.

In at least one of the various embodiments, if the workspace is initialized with a simple default fill value (zero, or otherwise), codecs may often perform poorly at the beginning stages of the compression process until the codec adapts the contents of workspace to the characteristics of the data provided on the input stream. In at least one of the various embodiments, as the codec processes symbols provided on the input stream, the workspace may begin to adapt accordingly, leading to improvements in compression.

However, in at least one of the various embodiments, if the workspace is initialized with workspace data that is selected to be optimized for a particular type of data stream, the time for the codec to reach optimal performance may be shortened. In at least one of the various embodiments, workspace 510 may be initialized with values that are selected for enabling the codec to have improved compression at the beginning of the compression process. The particular seeding data selected for generating the workspace data may depend on an analysis of the provided data and/or advance knowledge of the type of symbols or data patterns that may provided to input stream 502.

In at least one of the various embodiments, to enable codec systems to perform codec operations on data that has been compressed using workspace data generated from seeding data, the same seeding data used to generate the workspace data must be available to codec system performing the decompression. These seeding data may be stored locally at each codec system (e.g. Seeding Data 274, Seeding Data 312, Seeding Data 414, or the like.). Also, in at least one of the various embodiments, seeding data may be pulled from remote storage and/or services as needed.

In at least one of the various embodiments, a codec system may communicate seeding data to another codec system separate from a compressed data stream. Also, in at least one of the various embodiments, a service and/or process that may be running separate from the codec systems may communicate seeding data to one or more codec systems. Network based communication and/or exchange of seeding data may be pulled by the codec systems or pushed to the codec systems depending on the how the system may be configured and/or arranged. Further, in some embodiments, users may manually transfer seeding data to codec systems, using USB drives, optical-drives, file uploads, user-interface entry, or the like.

Figure 6:
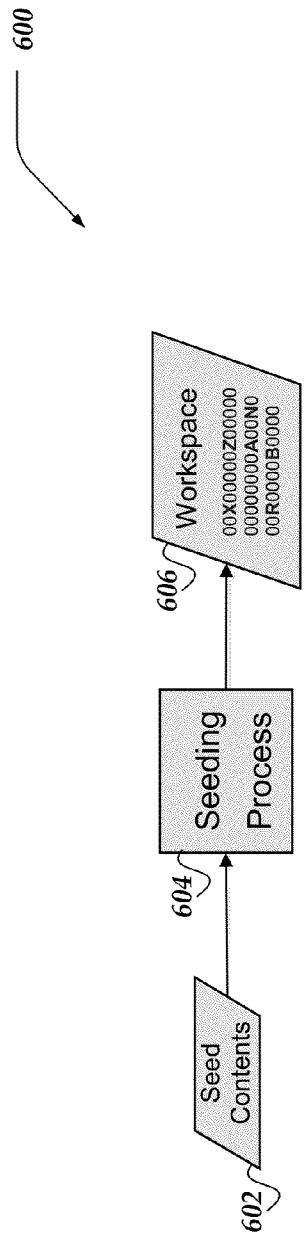
FIG. 6 illustrates a portion of a logical architecture for generating workspace data for codec operations in accordance with at least one of the various embodiments.

FIG. 6 illustrates a portion of logical architecture 600 for generating workspace data for codec operations in accordance with at least one of the various embodiments. In at least one of the various embodiments, seed contents 602 may be selected based on a real-time analysis of the data that is provided for compression or it may be selected based on advanced knowledge of the data that is expected to be provided to the input stream. Further, selection of seeding data may be selected based on a configuration value read from a file, a database, flash memory, or the like. In at least one of the various embodiments, seeding process 604 may transform the seeding data into workspace data 606 for use in a workspace, such as workspace 510. In at least one of the various embodiments, the seeding data may already be in formatted to be workspace data, in such cases the seeding data may be copied directly into the codec workspace.

Figure 7A:
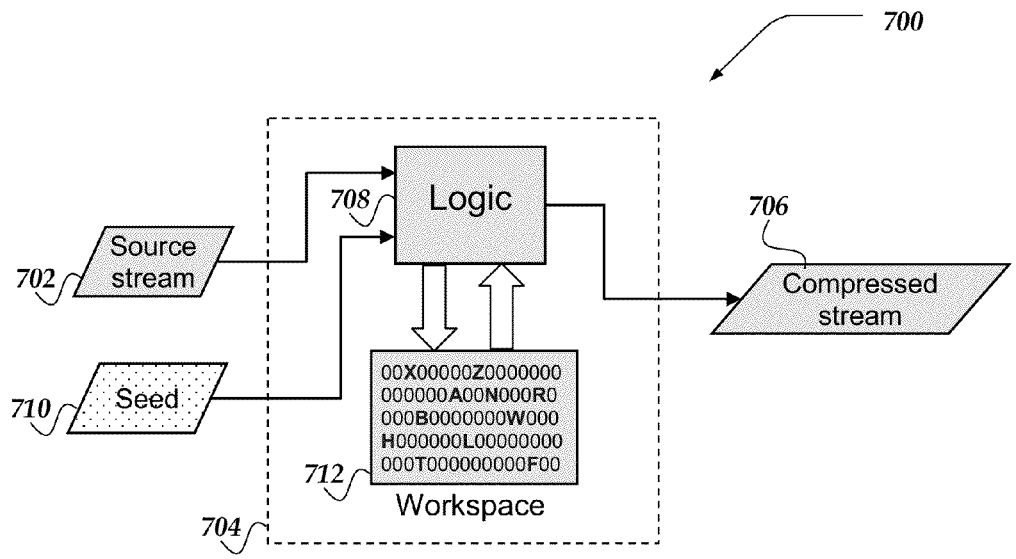
FIGS. 7A-7B illustrate a portion of a logical architecture for asymmetrical compressor operations in accordance with at least one of the various embodiments.
Figure 7B:
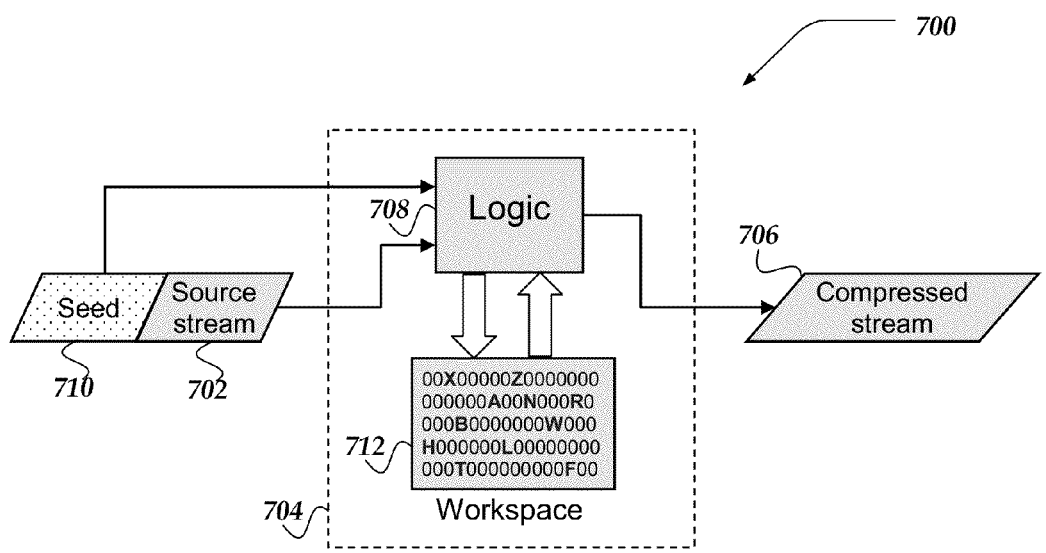

FIGS. 7A-7B illustrate a portion of a logical architecture for asymmetrical compression operations in accordance with at least one of the various embodiments.

FIG. 7A illustrates a portion of codec architecture 700 for asymmetrical compression operations. In at least one of the various embodiments, asymmetrical codecs may employ the same inputs as a symmetrical codecs but they may require the seeding data itself as extra input. In at least one of the various embodiments, this is because, unlike symmetrical codecs, the workspace used during asymmetrical compression may contain references to strings (e.g., data symbols sequences) rather than containing strings that could become potential matches. The actual strings pointed to by seeded workspace data may be the reference values pointing the seeding data that may be in either the source stream or within the seeding data. Thus, in at least one of the various embodiments, both compressors and decompressors require access to the seeding data during codec operations rather than just the workspace data.

In at least one of the various embodiments, source stream 702 and seeding data 710 may be provided to codec system 704. In at least one of the various embodiments, within codec system 704, there may be logic block 708 and workspace 712. In at least one of the various embodiments, logic block 708 may generate compressed stream 706 from seeding data 710, source stream 702 and workspace 712.

In at least one of the various embodiments, asymmetrical codecs, such as, LZ77 variants rely on the seeding data to be available during codec operations. FIG. 7A shows how, in at least one of the various embodiments, seeding data 710 may be provided to logic block 708 separately from the data provided by source stream 702. FIG. 7B shows how, in at least one of the various embodiments, seeding data 710 may be pre-pended to the data provided by source stream 702 before the data stream is provided to logic block 710.

Figure 8A:
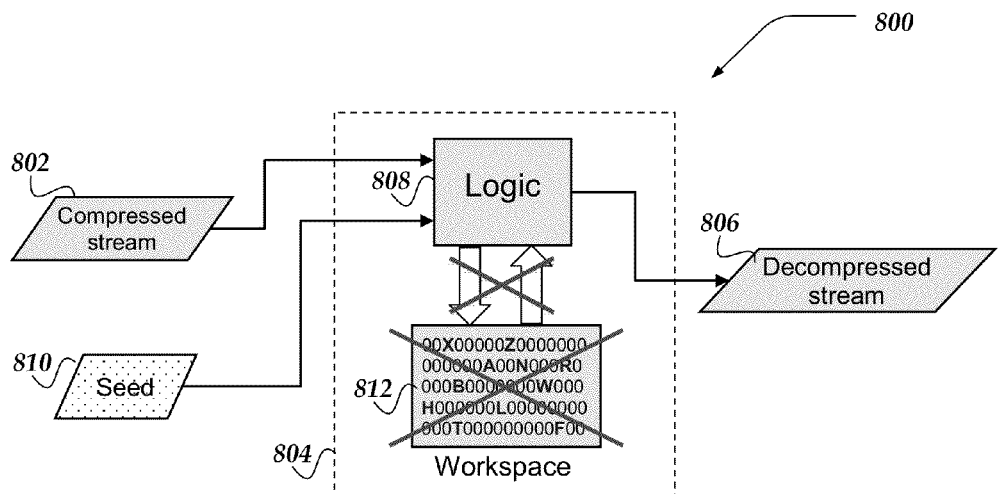
FIGS. 8A-8B illustrate a portion of a logical architecture for asymmetrical decompressor operations in accordance with at least one of the various embodiments.
Figure 8B:
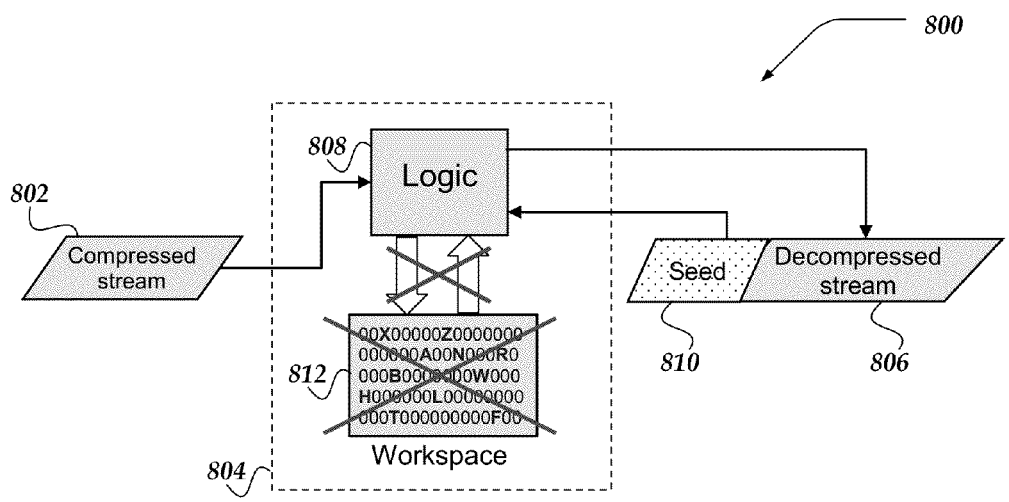

FIGS. 8A-8B illustrate a portion of a logical architecture for asymmetrical decompression operations in accordance with at least one of the various embodiments. FIG. 8A shows for at least one of the various embodiments, that an asymmetrical codec may be provided compressed data on compressed stream 802. The data provided by compressed stream 802 in combination with seeding data 810 may be used by logic block 808 to generate decompressed stream 806. In at least one of the various embodiments, the seeding data plays the role of already decompressed data that the reference values included in the data provided by compressed stream 802 may point to. Alternatively, FIG. 8B shows how seeding data 810 may be pre-pended to the decompressed data that may comprise decompressed stream 806. In this case, for asymmetrical codecs, the decompressed data is referenced by values included in the compressed stream. Thus, if at the origination of the compressed stream, seeding data was used to generate the references used in the compressed stream, the same seeding data must be made available by pre-pending it to the decompressed stream so it can be found by the back references included in the incoming compressed data. Accordingly, in at least one the various embodiments, as indicated in both FIG. 8A and FIG. 8B, workspace 812 may be unnecessary for codec system 800 during decompression operations.

Generalized Operations

Figure 9:
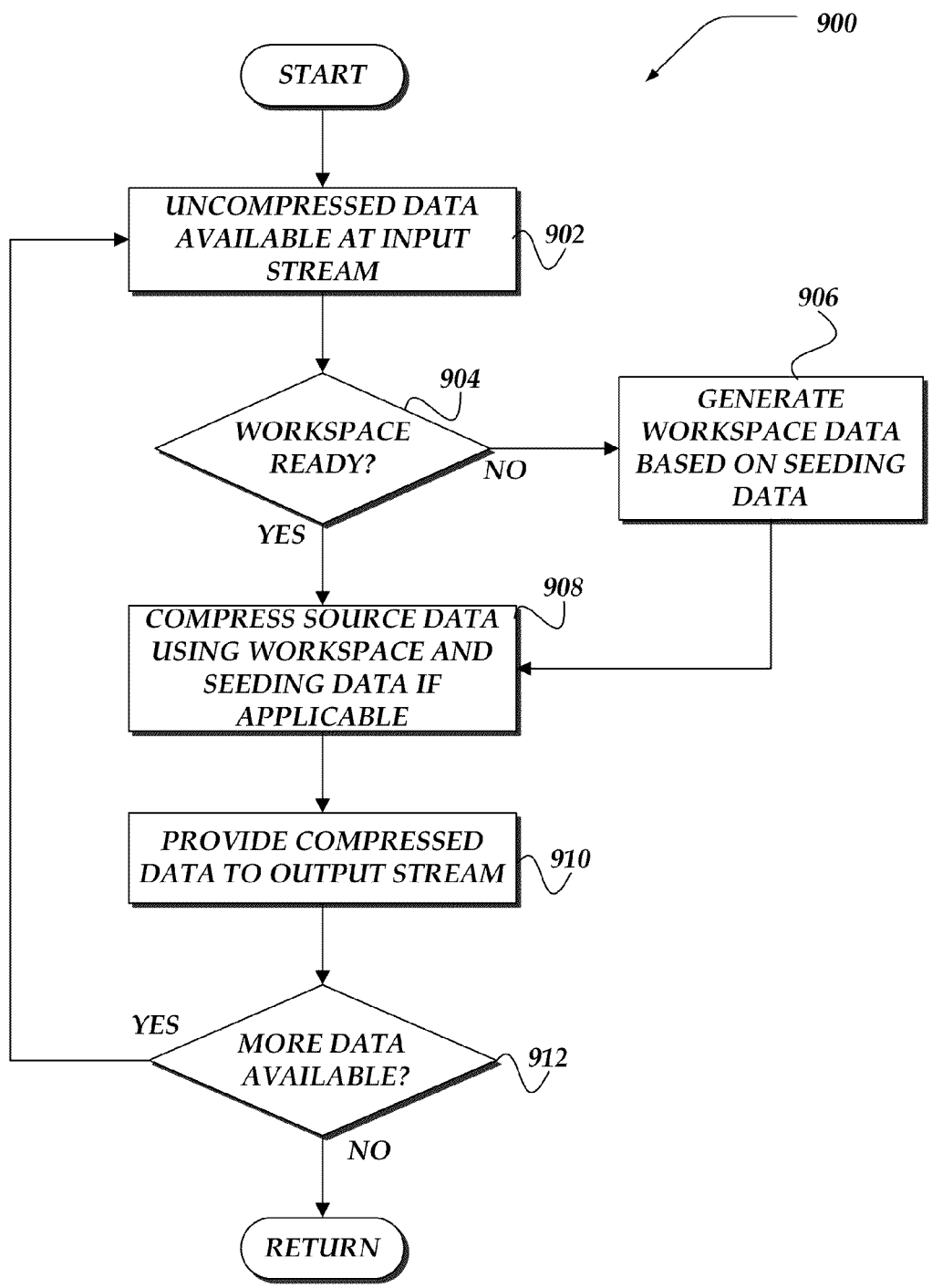
FIG. 9 shows an overview flowchart for a process for data compression operations in accordance with at least one of the various embodiments.
Figure 10:
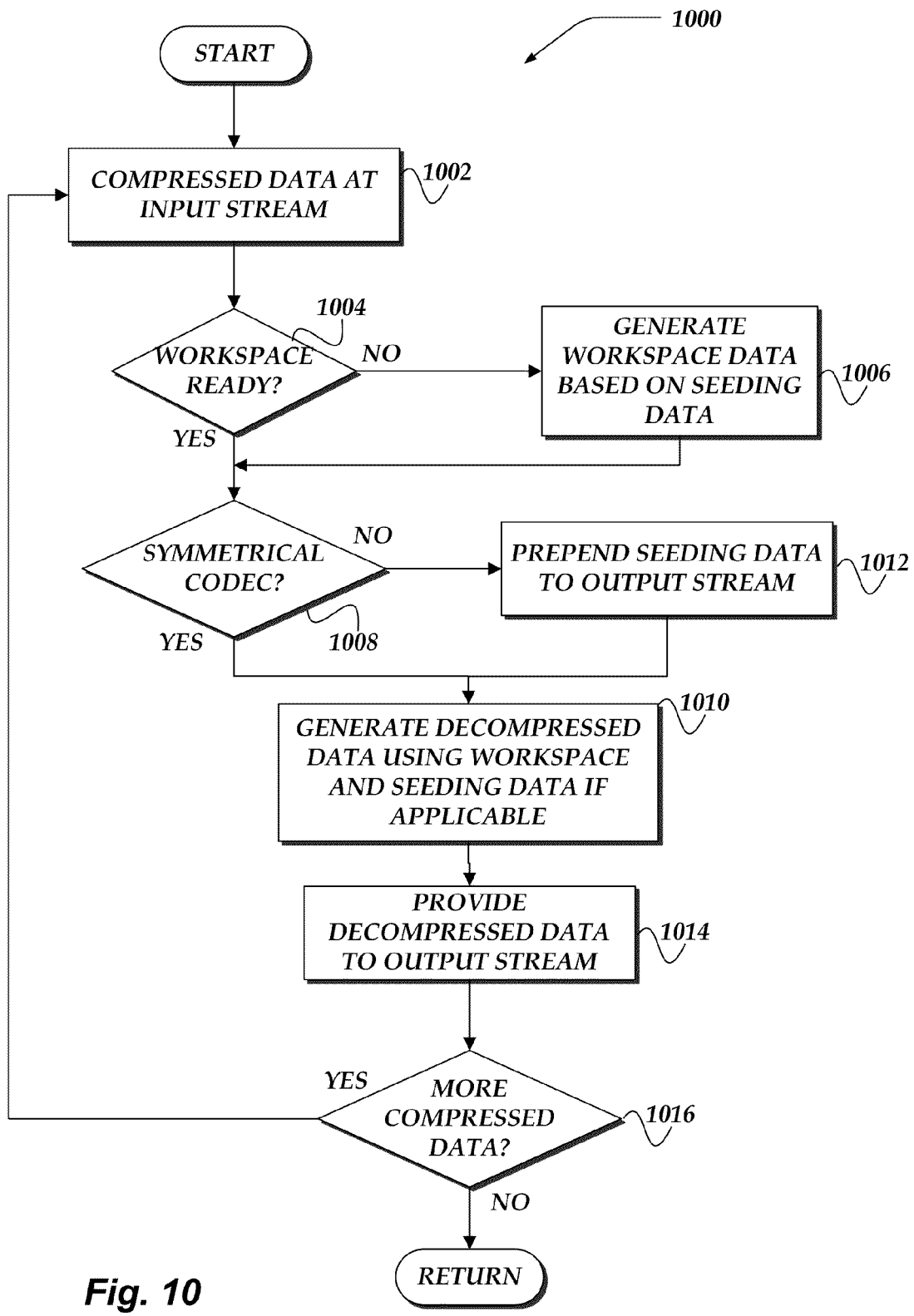
FIG. 10 shows an overview flowchart for a process for data decompression operations in accordance with at least one of the various embodiments.
Figure 11:
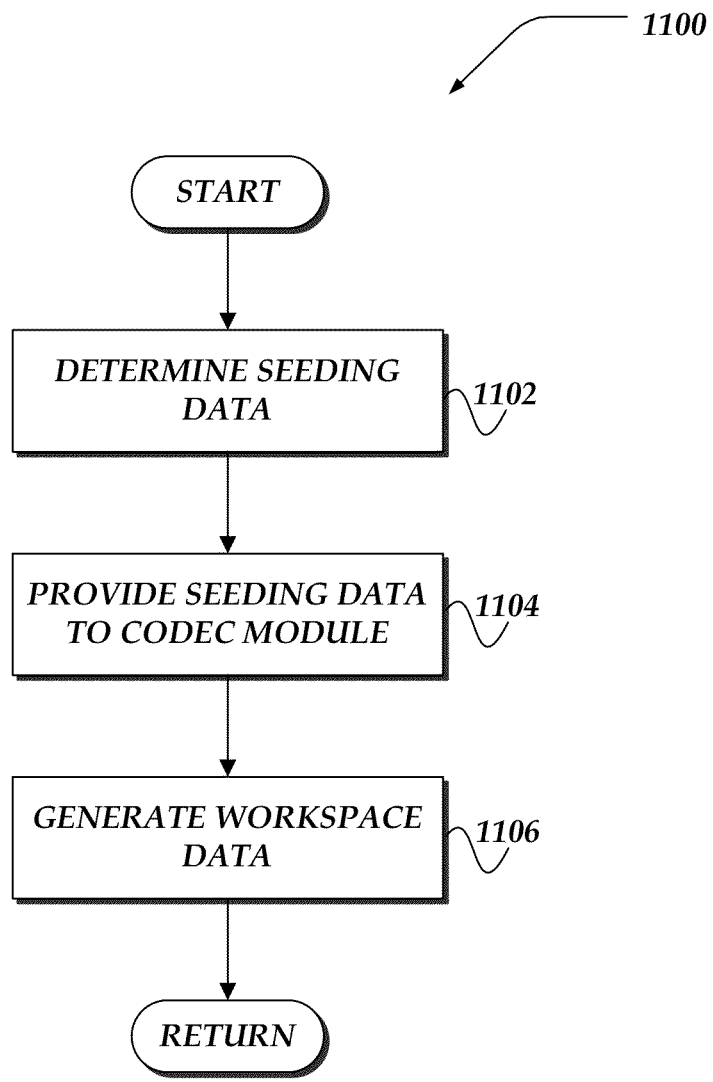
FIG. 11 shows an overview flowchart for a process for generating workspace data in accordance with at least one of the various embodiments.

FIGS. 9-11 represent the generalized operations of employing seeding data, workspace data, and/or workspaces to optimize codec operations in accordance with at least one of the various embodiments. In at least one of the various embodiments, processes 900, 1000, and 1100 described in conjunction with FIGS. 9-11 may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes or portions thereof may be implemented by and/or executed on one or more blade servers, such as blade server 250 of FIG. 2B. However, embodiments are not so limited, and various combinations of network devices, blade servers, or the like may be utilized. Also, since codec operations may be performed on other computing devices, these processes or portions of process thereof may be implemented by and/or executed on a plurality of network devices, such as client device 300 of FIG. 3. Further, in at least one of the various embodiments, the processes described in conjunction with FIGS. 9-11 may be operative in codec architectures such as those described in conjunction with FIGS. 5-8.

FIG. 9 shows an overview flowchart for process 900 for data compression operations in accordance with at least one of the various embodiments. After at start block, at block 902, in at least one of the various embodiments, uncompressed data may be made available at an input stream.

At decision block 904, in at least one of the various embodiments, if the codec workspace is prepared, control may flow to block 908. Otherwise, control may flow block 906. In at least one of the various embodiments, workspace data may not be required by some codecs. In this case, the workspace may be considered prepared and/or ready for operations to continue without generating workspace data.

Also, in at least one of the various embodiments, the workspace data may be retrieved from storage rather than generated on the fly. In such cases, stored workspace data may be associated with particular data types. If data provided to the input stream determined to be associated with stored workspace data, that workspace data may be retrieved from storage and used for codec operations.

At block 906, in at least one of the various embodiments, the workspace data that may be required by the codec may be generated. In at least one of the various embodiments, particular workspace data may be generated from one or more portions of seeding data.

In at least one of the various embodiments, the workspace data for symmetrical codecs may be generated from seeding data and then placed directly into the workspace before compression of the uncompressed data begins.

In at least one of the various embodiments, asymmetrical codecs may feed the seeding data into the input stream, effectively pre-pending the seeding data to incoming stream of uncompressed data before the compression computations actually begin. Thus, as the compression starts up, the workspace data is generated and stored in workspace.

At block 908, in at least one of the various embodiments, the codec processor may compress the source data that may be provided at the input stream. The workspace data may be used as part of the compression operations, the actual contents of the workspace and how it contributes to the compression operation may vary based on the codec that is being employed. In any event, the workspace data may be arranged to operate in accordance within the standard operations of the codec being used. In at least one of the various embodiments, seeding data may be employed in conjunction with the workspace to compress the source data.

Next, at block 910, the compressed data may be provided to the output stream for use by one or more downstream processes. Such downstream processing may include transmitting the compressed data over network, saving it in a file, writing it to a database, or the like.

At decision block 912, in at least one of the various embodiments, if there is more data available, control may loop back to block 902 to continue compression operations; otherwise, control may be returned to a calling process.

In at least one of the various embodiments, optionally, if there is more data available, control may loop back to block 908 to continue compression operations. In at least one of the various embodiments, the determination to loop to block 902 or to loop to 908 may be based on one or more factors, including, protocol messages received at the input stream or other backchannel inputs (e.g., end-of-session, start-of-session, data-type-change, or the like), data-type detection, or the like.

FIG. 10 shows an overview flowchart for process 1000 for data decompression operations in accordance with at least one of the various embodiments. After a start block, at block 1002, compressed data may be provided to an input stream.

At decision block 1004, if the workspace data is ready and/or prepared (e.g., seeded), control may flow to decision block 1008; otherwise, control may flow to block 1006.

At block 1006, the workspace data may be generated based on at least portion of seeding data. In at least one of the various embodiments, the seeding data may be selected based on the type data being uncompressed, configuration values, user direction, or the like.

Also, in at least one of the various embodiments, the workspace data may be retrieved from storage rather than generated on the fly. In such cases, stored workspace data may be associated with particular data types. If data provided to the input stream determined to be associated with stored workspace data, that workspace data may be retrieved from storage and used for codec operations. Next, control may flow to decision block 1008.

At decision block 1008, in at least one of the various embodiments, if the codec being employed in the decompression operations is symmetrical, control may flow block 1010; otherwise, control may flow to block 1012.

At block 1010, the data provided to the input stream may be decompressed in accordance with the currently operative codec, wherein the workspace data is employed by the codec as part of the decompression operations. In at least one of the various embodiments, as called for by the operative codec, the seeding data pre-pended to the output stream may be employed as part of the decompression process; or in at least one of the various embodiments, the workspace data located in the workspace may be employed during the decompression operation. Next, control may flow to block 1016.

At block 1012, in at least one of the various embodiments, after generating workspace data from seeding data and storing in a workspace, the seeding data may be pre-pended to the output stream. In at least one of the various embodiments, the workspace data may include the same content/symbols as the seeding data, in uncompressed form, that were used during the compression of the data being decompressed.

Figure 2B:
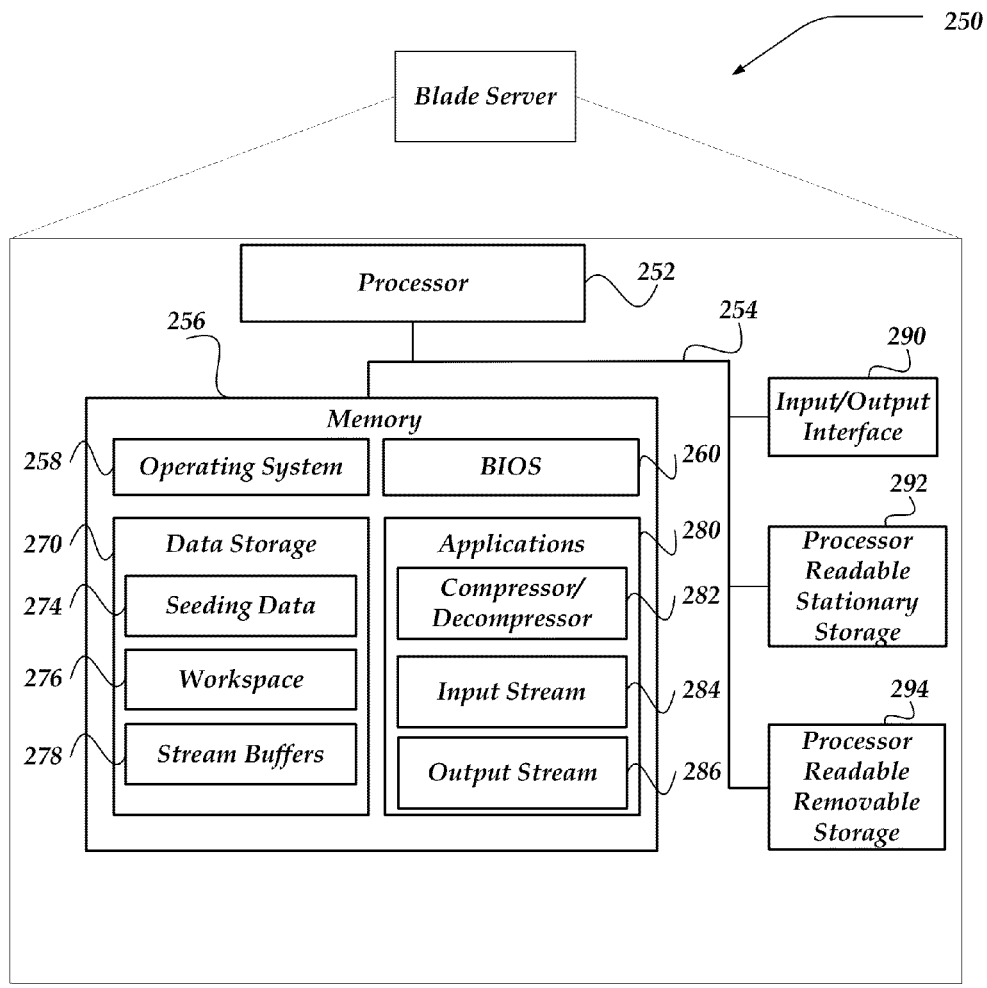
FIG. 2B illustrates a schematic embodiment of a blade server that may be included in a rack of blade servers such as that shown in FIG. 2A.

In at least one of the various embodiments, for some asymmetrical codecs the workspace (e.g. FIG. 2B, workspace 276; FIG. 3, workspace 314; FIG. 4, workspace 416; FIG. 5, workspace 510; or the like) may not be used during decompression operations. In these cases, as mentioned above, the reference values used for implementing the compression are carried in this the compressed stream itself. Accordingly, the seeding data that the reference strings refer to may be pre-pended to the uncompressed output stream.

At block 1014, the decompressed data may be provided to an output stream. Next, in at least one of the various embodiments, control may flow to decision block 1016.

At decision block 1016, if there may be more compressed data available for processing, control may loop back to block 1002 for further processing; otherwise, control may be returned to a calling process. In at least one of the various embodiments, optionally, if there is more data available, control may loop back to block 1010 to continue compression operations. In at least one of the various embodiments, the determination to loop to block 1002 or to loop to 1010 may be based on one or mote factors, including, protocol messages received at the input stream or other backchannel inputs (e.g. end-of-session, start-of-session, data-type-change, or the like), data-type detection, or the like.

FIG. 11 shows an overview flowchart for process 1100 for generating workspace data in accordance with at least one of the various embodiments. After a start block, at block 1102, the seeding data may be determined. In at least one of the various embodiments, seeding data may be retrieved from a seeding data store, such as, seeding data store 274, or seeding data store 312, or the like. Next, at block 1104, the determined seeding data may be provided to a codec processor.

Next, at block 1106, workspace data based on at least a portion of the determined seeding data may be generated. In at least one of the various embodiments, the codec processor may generate the workspace data by processing the seeding data the same as it processes the source data. However, the compressed data resulting from generating workspace data may be discarded rather than provided to au output stream.

In at least one of the various embodiments, the same codec processors used for compression and/or decompression data may be used to generate the workspace data from the seeding data. In some embodiments, data provided to the output stream may be disregarded if workspace data is being generated from seeding data. Using the same codec processor for generating workspace data as it used for performing normal codec operations may be advantageous because the same hardware and/or software components may be reused. This may reduce the size and/or memory footprint of the codec system that includes seeding capabilities. After the workspace data is generated it may be used immediately for codec operations and/or stored for future use.

Illustrative Use Case

FIGS. 12A-12B include pseudo-code that illustrates process 1200 for seeding codec operations in accordance with at least one of the various embodiments. FIG. 12A shows a portion of pseudo-code for generating workspace data from seeding data in accordance with at least one the various embodiments. To generate the seeded workspace, the Seeding( ) function first resets the contents of the memory workspace (seeded_mem) and routes it to the external workspace (mem) of the Compress( ) function. The seed contents (seed) may then be passed to the input stream (istream), and the output stream (ostream) receives the null device, meaning the compressed output is discarded. After the seed contents are compressed, the seeded workspace is obtained by taking a snapshot of the memory workspace final state.

FIG. 12B shows a portion of pseudo-code for performing codec operations using workspace data generated from seeding data, in accordance with at least one of the various embodiments. The Compress( ) function itself is specific to the particular compression algorithm used, but it can be roughly described using the pseudo code listed in FIG. 12. Note, that in this example seeding mode may be self-detected by checking for a null value (nil) for the output stream. In this example, Engine_Compress( ) represents a call to the particular compression engine used which receives a symbol or a function of the current and previous symbols (symbol), the memory workspace (mem), the current state of the compression engine (engine_state), and generates some compressed output, if any, during each iteration. In this example, since the compressor operation is set to seeding mode, any compressed output is discarded. The only usable output during the seeding process is the workspace data, which contains specific redundancies for the given input seed. The Engine_Create( ) and Engine_Destroy( ) functions perform construction, initialization, and destruction of the compression engine object state.

What is claimed as new and desired to be protected by Letters Patent of the United States is:

1. A method for communicating data between a plurality of a network devices, employing at least one of the network devices to perform actions, comprising:
   determining a portion of seeding data based on at least one characteristic of a codec, wherein data for a workspace is based on the portion of seeding data and the codec;
   responsive to other data being provided to an input stream, performing further actions, including:
      generating modified other data based on the codec, wherein the initial generation of the modified other data uses at least the portion of workspace data; and
      providing the modified other data to an output stream.

2. The method of claim 1, further comprising, generating the portion of workspace data based on the portion of determined seeding data and the codec.

3. The method of claim 1, further comprising, retrieving the portion of workspace data from storage wherein, the stored workspace data is associated with one or more particular data types.

4. The method of claim 1, further comprising, retrieving the seeding data from a seeding data store.

5. The method of claim 1, further comprising, if the codec is asymmetrical and the other data is being decompressed by the codec, pre-pending the determined seeding data to the output stream before the other data is decompressed.

6. The method of claim 1, further comprising, if the codec is asymmetrical and the other data is being compressed by the codec, pre-pending the seeding data to the input stream before the other data is compressed.

7. A system arranged for communicating data between a plurality of network devices, comprising:

a server device, including:
  a transceiver that is operative to communicate over the network;
  a memory that is operative to store at least instructions; and
  a processor device that is operative to execute instructions that enable actions, including:
    determining a portion of seeding data based on at least one characteristic of a codec, wherein data for a workspace is based on the portion of seeding data and the codec;
    responsive to other data being provided to an input stream, performing further actions, including:
      generating modified other data based on the codec, wherein the initial generation of the modified other data uses at least the portion of workspace data; and
      providing the modified other data to an output stream; and
a client device, comprising,
  a transceiver that is operative to communicate over the network;
  a memory that is operative to store at least instructions; and
  a processor device that is operative to execute instructions that enable actions, including:
    receiving the modified other data on another input stream; and
    processing the modified other data using the codec.

8. The system of claim 7, wherein the server device processor device enables actions further comprising, generating the portion of workspace data based on the portion of determined seeding data and the codec.

9. The system of claim 7, wherein the server device processor device enables actions further comprising, retrieving the portion of workspace data from storage wherein, the stored workspace data is associated with one or more particular data types.

10. The system of claim 7, wherein the server device processor device enables actions further comprising, retrieving the seeding data from a seeding data store.

11. The system of claim 7, wherein the server device processor device enables actions further comprising, if the codec is asymmetrical and the other data is being decompressed by the codec, pre-pending the determined seeding data to the output stream before the other data is decompressed.

12. The system of claim 7, wherein the server device processor device enables actions further comprising, if the codec is asymmetrical and the other data is being compressed by the codec, pre-pending the seeding data to the input stream before the other data is compressed.

13. A network device that is operative for communicating data between a plurality of network devices over a network, comprising:
  a transceiver that is operative to communicate over a network;
  a memory that is operative to store at least instructions; and
  a processor device that is operative to execute instructions that enable actions, including:
    determining a portion of seeding data based on at least one characteristic of a codec, wherein data for a workspace is based on the portion of seeding data and the codec;
    responsive to other data being provided to an input stream, performing further actions, including:
      generating modified other data based on the codec, wherein the initial generation of the modified other data uses at least the portion of workspace data; and
      providing the modified other data to an output stream.

14. The network device of claim 13, wherein the processor device enables actions further comprising, generating the portion of workspace data based on the portion of determined seeding data and the codec.

15. The network device of claim 13, wherein the processor device enables actions further comprising, retrieving the portion of workspace data from storage wherein, the stored workspace data is associated with one or more particular data types.

16. The network device of claim 13, wherein the processor device enables actions further comprising, retrieving the seeding data from a seeding data store.

17. The network device of claim 13, wherein the processor device enables actions further comprising, if the codec is asymmetrical and the other data is being decompressed by the codec, pre-pending the determined seeding data to the output stream before the other data is decompressed.

18. The network device of claim 13, wherein the processor device enables actions further comprising, if the codec is asymmetrical and the other data is being compressed by the codec, pre-pending the seeding data to the input stream before the other data is compressed.

19. A processor readable non-transitive storage media that includes instructions for communicating data between a plurality of a network devices, wherein execution of the instructions by a processor device enables actions, comprising:
  determining a portion of seeding data based on at least one characteristic of a codec, wherein data for a workspace is based on the portion of seeding data and the codec;
  responsive to other data being provided to an input stream, enabling further actions, including:
    generating modified other data based on the codec, wherein the initial generation of the modified other data uses at least the portion of workspace data; and
    providing the modified other data to an output stream.

20. The media of claim 19, further comprising, generating the portion of workspace data based on the portion of determined seeding data and the codec.

21. The media of claim 19, further comprising, retrieving the portion of workspace data from storage wherein, the stored workspace data is associated with one or more particular data types.

22. The media of claim 19, further comprising, retrieving the seeding data from a seeding data store.

23. The media of claim 19, further comprising, if the codec is asymmetrical and the other data is being decompressed by the codec, pre-pending the determined seeding data to the output stream before the other data is decompressed.

24. The media of claim 19, further comprising, if the codec is asymmetrical and the other data is being compressed by the codec, pre-pending the seeding data to the input stream before the other data is compressed.

* * * * *